United States Patent [19]
Kuwabara

[11] 3,824,447
[45] July 16, 1974

[54] BOOSTER CIRCUIT
[75] Inventor: Tsuneo Kuwabara, Tokyo, Japan
[73] Assignee: Kabushiki Kaisha Daini Seikosha, Tokyo, Japan
[22] Filed: Nov. 30, 1972
[21] Appl. No.: 310,911

[30] Foreign Application Priority Data
Feb. 24, 1972  Japan.............................. 47-19237
Dec. 3, 1971   Japan.............................. 46-97235

[52] U.S. Cl. ................................ 321/15, 307/110
[51] Int. Cl. ......................................... H02m 7/00
[58] Field of Search ............... 307/109, 110; 321/15

[56] References Cited
UNITED STATES PATENTS
3,111,594  11/1963  Stolte................................. 307/110
3,646,425  2/1972   Beck et al........................... 321/15

OTHER PUBLICATIONS
H. R. Mallory, "Capacitors Add Up In Voltage Multiplier," Electronics, March 2, 1970, p. 104.

Primary Examiner—William M. Shoop, Jr.
Attorney, Agent, or Firm—Eric H. Waters

[57] ABSTRACT

A booster circuit is provided which comprises a booster output capacitor and a plurality of capacitors, which are connected in parallel to a booster power supply for being charged when a voltage of a first level is applied to an input terminal of the booster circuit and, on the other hand, connected in series with each other when a voltage of a second level is applied thereto. The alternate application of the voltages having the first and second levels in repetitive manner allows the generation of a boosted voltage across the booster output capacitor.

2 Claims, 10 Drawing Figures

BOOSTER CIRCUIT

FIELD OF INVENTION

The present invention relates to a booster circuit, and more particularly to a small-sized booster circuit for low power with high output voltage and high converting efficiency.

BACKGROUND OF INVENTION

Conventionally, well-known booster circuits are equipped with a transformer which, however, requires a large space and is not suitable for use with a power supply source utilized for display purposes in small devices such as electronic wrist watches. Moreover, a booster circuit of the voltage doubler type disadvantageously results in low converting efficiency in its boosting function.

SUMMARY OF INVENTION

An object of the present invention is to provide a small-sized booster circuit with a high output voltage and high converting efficiency.

Another object of the present invention is to provide a small-sized booster circuit capable of being connected to a low-power and high voltage load such as a liquid crystal panel.

A booster circuit according to the present invention comprises a power supply; an input terminal to which a signal voltage having first and second alternately appearing levels is applied; a plurality of capacitors; first means for connecting said capacitors in parallel to said power supply when the signal voltage of said first level is applied to said input terminal; a booster output capacitor; and second means for connecting said capacitors in series with each other and with said booster output capacitor and said power supply when the signal voltage of said second level is applied to said terminal, thereby producing a boosted voltage across said booster output capacitor.

DETAILED DESCRIPTION

Figures 1, 2, 3:
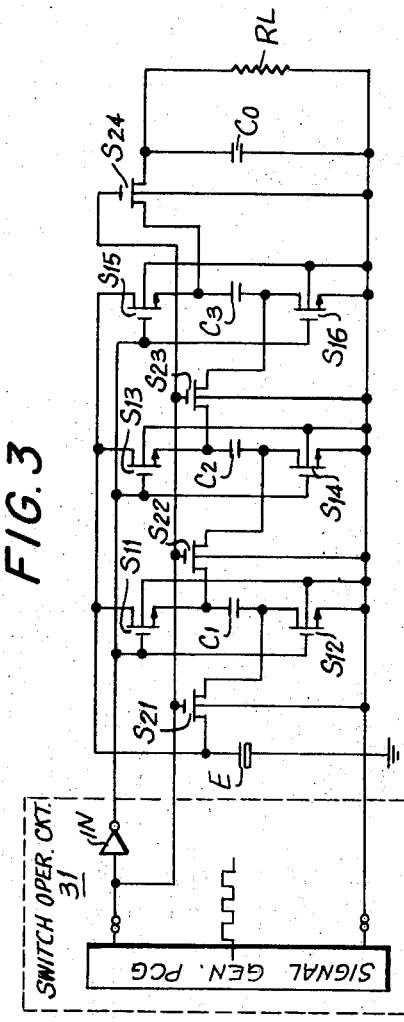
FIG. 1 is an explanatory circuit diagram showing a principle employed in a booster circuit according to the invention.
FIG. 2 is another explanatory circuit diagram showing another principle employed in accordance with the invention.
FIG. 3 is a schematic circuit diagram of a booster circuit according to one embodiment of the present invention.

FIGS. 1 and 2 are circuit diagrams showing principles used in the present invention. In FIG. 1, capacitors $C_1$–$C_3$ having the same capacitance are connected in parallel to a booster power source E having a voltage E. Additionally, a load resistor $R_L$ and a booster output capacitor Co are connected in parallel to the power source E through a switch $S_{24}$. As shown in FIG. 1, when the switch $S_{24}$ is opened, each capacitor $C_1$–$C_3$ connected in parallel is rapidly charged by the power source E until the voltage across these capacitors reaches the voltage E.

In the circuit shown in FIG. 2, the capacitors $C_1$–$C_3$, charged to the voltage E by the circuit shown in FIG. 1, are connected in series with each other and with the booster output capacitor Co and load resistor $R_L$ when the switch $S_{24}$ is closed. In this case, the booster output capacitor Co is charged to the voltage 4E, that is, the sum of the voltage E of the power source E of the booster and the voltages across the three series connected capacitor $C_1$–$C_3$. When the load resistor $R_L$ has very high value, the voltage $(\frac{1}{3} C)/(\frac{1}{3} C + C_0) \times 4$ is applied across the booster output capacitor Co. Assuming that the value of the booster output capacitor Co is less than C the voltage across the booster output capacitor is boosted to a level greater than the voltage E of the booster power source E.

The present invention is realized by application of the above-mentioned theory or principle, and comprises a switch operating circuit 31 (FIG. 3) including a signal generator PCG and inverter IN, electronic switches $S_{11}$, $S_{12}$, $S_{13}$, $S_{14}$, $S_{15}$, $S_{16}$, $S_{21}$, $S_{22}$, $S_{23}$ and $S_{24}$ operated by the signals from the switch operating circuit 31, a booster power source E, capacitors $C_1$–$C_3$, a booster output capacitor Co, and a load resistor $R_L$.

When a signal "0" from the signal generator PCG is generated, an output signal "1" (referred to as a first signal) is produced by the switch operating circuit 31 by means of inverter IN and is applied to the gates of MOS field effect transistors (FET) $S_{11}$, $S_{12}$, $S_{13}$, $S_{14}$, $S_{15}$ and $S_{16}$ (referred to as first FETs), so as to render the connection between the drains and sources of the first FETs conductive.

On the other hand, an output signal "0" from the signal generator PCG (note that this is also the first signal from the switch operating circuit 31) is applied to the MOS FETs $S_{21}$, $S_{22}$, $S_{23}$ and $S_{24}$ (referred to as second FETs) so as to interrupt the connection between the drains and source of the second FETs. Accordingly, the circuit in the embodiment shown in FIG. 3 becomes equivalent to the circuit shown in FIG. 1, thus charging each capacitor $C_1$–$C_3$ rapidly to the same voltage E as the voltage of the booster power source E.

When the output signal from the generator PCG turns to "1" (referred to as a second signal), the output of the inverter IN is changed to "0". Accordingly, the first FETs have the connection between their drains and sources turned off. Therefore, the circuit shown in the embodiment of FIG. 3 becomes equivalent to the circuit shown in FIG. 2, so that the booster output capacitor Co is charged by the voltages across the capacitors charged by the first signal and the voltage of the booster power source E.

The period of the signal generated by the electronic switch operating circuit 31 will be next described in connection with FIGS. 4 and 5. When each capacitor $C_1$–$C_3$ is charged by the booster power source E as shown in FIG. 1, i.e., when the electronic switch $S_{24}$ is opened, the discharging time constant $\tau_1$ for the output capacitor Co is expressed by a formula $\tau_1 = C_o R_L$ where $R_L$ is the resistance of the load resistor. When the circuit becomes equivalent to the circuit shown in FIG. 2 upon turning off of the switch $S_{24}$, a charging time constant $\tau_2$ is as given by $\tau_2 = [(C/3) \times C_o/(C/3) \times C_o] \times r$, where r is the total conductive resistance of MOS FETs. Therefore, in order to supply the required boosted voltage to the load resistor $R_L$ in the normal state, the period of the first and second signals from the signal generator PCG should be shorter than the sum of the charging time constant $\tau_2$ and discharging time constant $\tau_1$. As shown in FIG. 5, when the first signal generating time $t_1$ is set to be smaller than the second signal generating time $t_2$ so as to make the first signal generating $t_1$ smaller than the charging time constant $\tau_1$, high boosting efficiency is realized.

Figure 6:
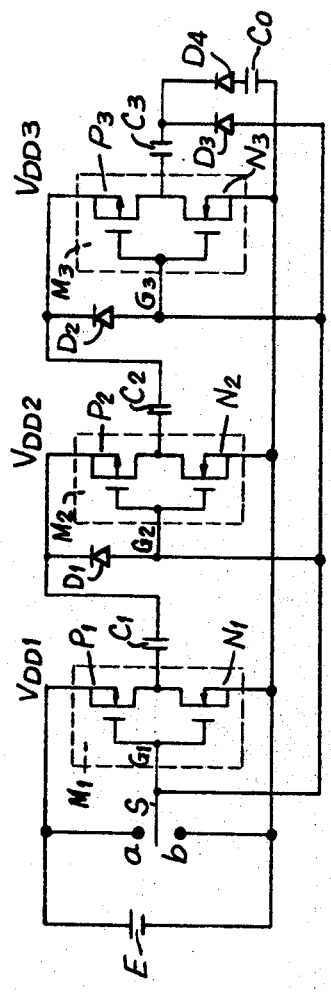
FIG. 6 is a schematic circuit diagram of a booster circuit according to another embodiment of the present invention.

In FIG. 6, there is shown another embodiment of a booster circuit according to the present invention which comprises a booster power source E for supplying a voltage to a complementary MOS FET $M_1$, and complementary MOS FETs $M_1$, $M_2$ and $M_3$ for charging and discharging capacitors $C_1$, $C_2$ and $C_3$. Switching diodes $D_1$, $D_2$ and $D_3$ are rendered conductive when the capacitors $C_1$, $C_2$ and $C_3$ are charged, and rendered non-conductive when the capacitors $C_1$, $C_2$ and $C_3$ are discharged and when booster output capacitor Co is charged.

Figure 7:
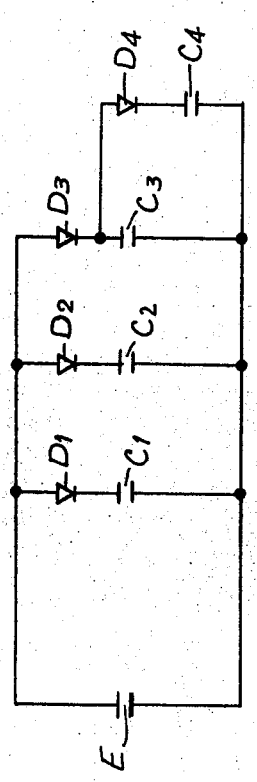
FIGS. 7 and 8 are, respectively, diagrams of equivalent circuits corresponding to the circuit of FIG. 6.
Figure 9:
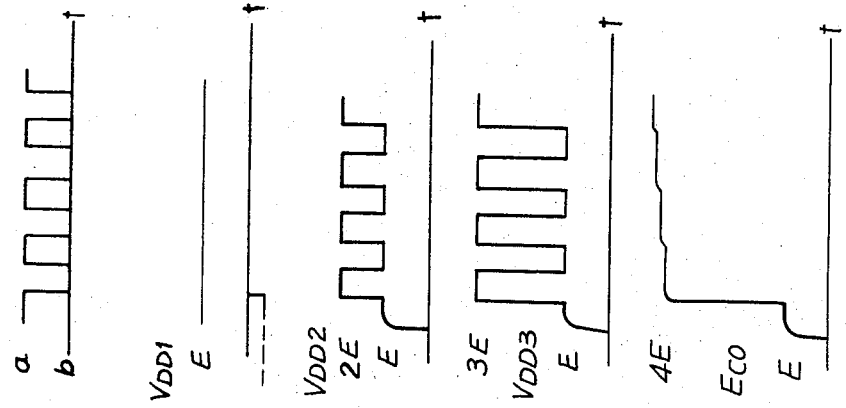
FIG. 9 is a chart showing the wave forms produced at the terminals of the circuit in FIG. 6.

When a switch S is connected to a terminal a, the voltage of a booster power source E is supplied to input terminals $G_1$, $G_2$ and $G_3$ of the complementary MOS field effect transistors $M_1$, $M_2$ and $M_3$ to render P-channel MOS FETs $P_1$, $P_2$ and $P_3$ non-conductive and to render N-channel MOS FETs $N_1$, $N_2$ and $N_3$ conductive. As a result, three closed circuits are formed along the path defined by the positive terminal of the booster power source E, the switching diode $D_1$ ($D_2$, $D_3$), the N-channel MOS FET $N_1$ ($N_2$, $N_3$), and the negative terminal of the power source, respectively, thus changing the capacitors $C_1$, $C_2$ and $C_3$ to the voltage of the power supply E. Further, the booster output capacitor $C_0$ is charged by the booster power source E through the switching diodes $D_3$ and $D_4$ when switch S is connected to the terminal a. Accordingly, the voltage across the charging capacitance $C_0$ becomes approximately equal to E, because the diodes $D_3$ and $D_4$ have only a very small resistance. The charging state is shown by the equivalent circuit in FIG. 7.

When the switch S is connected to a terminal b, the P-channel channel MOS FET $P_1$ in the complementary MOS FET $M_1$ is turned on while the N-channel MOS FET $N_1$ is turned off, so that the charging capacitor $C_1$ is connected in series with the booster power source E. Simultaneously, the P-channel MOS FET $P_2$ of the complementary MOS FET $M_2$ is turned on, and the N-channel MOS FET $N_2$ is turned off, so that the charging capacitor $C_2$ is connected in series through the charging capacitor $C_1$ and the P-channel MOS FET $P_2$.

Figure 8:
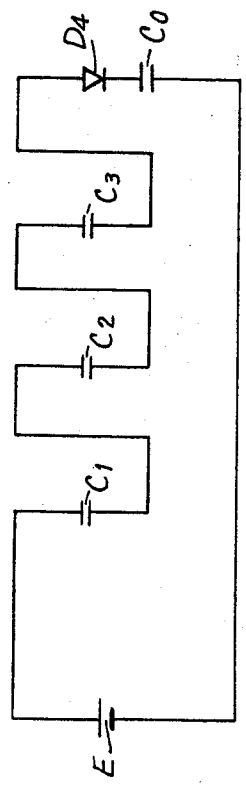
Figure 10:
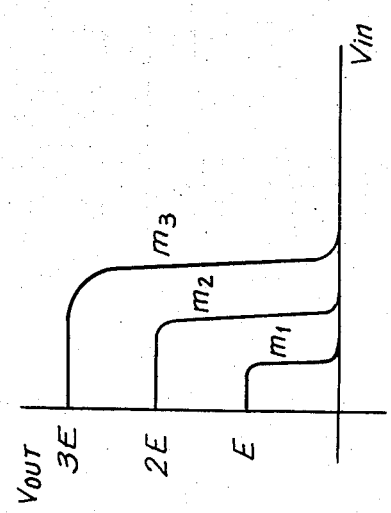
FIG. 10 is a chart showing the input and output characteristics of a complementary MOS FET transistor employed in the present invention.

On the other hand, the P-channel MOS FET $P_3$ of the complementary MOS FET $M_3$ is turned on, and the N-channel MOS FET is turned off so that the charging capacitor $C_3$ is connected through the P-channel MOS FET $P_3$. At this time, a closed circuit is formed along the path defined by the positive terminal of the booster power source E, the P-channel MOS FET $P_1$, the capacitor $C_1$, the P-channel MOS FET $P_2$, the capacitor $C_2$, the P-channel MOS FET $P_3$, the capacitor $C_3$, the switching diode $D_4$, a booster output capacitor $C_0$ and the negative terminal of the booster power source E. According to the closed circuit, the booster output capacitor $C_0$, the booster power source E, the charging capacitor $C_1$, the charging capacitor $C_2$ and the charging capacitor $C_3$ are connected in series. Consequently, the voltage 4E consisting of the voltages across the series-connected charging capacitors $C_1$, $C_2$ and $C_3$ and the power source appears across the booster output capacitor through the switching diode, because the conductive resistance of the P-channel MOS FET is low enought to be negligible. FIG. 8 shows the equivalent circuit of the booster circuit of FIG. 7 in the second state.

It is to be noted that when the capacitance of the booster output capacitor $C_0$ is larger than that of one of the charging capacitors $C_1$, $C_2$ and $C_3$, the voltage across the capacitor $C_0$ cannot reach 4E at a time when the switch S is alternately turned from a to b.

The conditions where the switch S is alternately connected to the terminals a and b with repetition will be described. When the switch S is connected to the terminal a, the booster circuit shown in FIG. 6 is represented by the equivalent circuit diagram in FIG. 7. Thus the power supplying terminal $V_{DD1}$ of the complementary MOS FET $M_1$ is supplied with the voltage E from the booster power source. Furthermore, power supplying terminals $V_{DD2}$ and $V_{DD3}$ of the complementary MOS FETs $M_2$ and $M_3$ are supplied with the charging voltage for charging the capacitors $C_1$ and $C_2$. A booster output capacitor $C_0$ is charged by the power supply with a time constant defined by the resistance of the switching diodes $D_3$ and $D_4$ and an output capacitor.

When the switch S is connected to the terminal b, the power supplying terminal $V_{DD1}$ of the complementary MOS FET $M_1$ is supplied with the voltage E. The voltage from the booster power source E and across the capacitor $C_1$ is applied to the power source terminal $V_{DD2}$ of the complementary MOS FET $M_2$. On the other hand, the voltage 4E, the total of the voltage of the booster power source E and capacitors $C_1$ and $C_2$ is applied to the power source terminal $V_{DD3}$ of the complementary MOS FET $M_3$. Across the booster output capacitor $C_0$, therefore, appears the voltage which is determined by the capacitance of the capacitors $C_1$, $C_2$ and $C_3$ and the booster output capacitor $C_0$. The voltage cannot actually reach 4E, even if the forward voltage drop of the switching diodes $D_1$, $D_2$, $D_3$ and $D_4$ were to be neglected.

When the switch S is again connected to the terminal a, power supplying terminals $V_{DD2}$ and $V_{DD3}$ are supplied with the voltage E, while the other terminal $V_{DD1}$ remains unchanged. The voltage across the booster output capacitor is constant so far as the load is not connected. When the switch S is connected again to the terminal b, the voltages of the power supplying terminals $V_{DD1}$, $V_{DD2}$ and $V_{DD3}$ are changed as shown in FIG. 3, so that the voltage across the booster output capacitor $C_0$ is increased. Thus, when the switch S is repeatedly operated, the voltage across the terminals $EC_0$ of the booster output capacitor $C_0$ approaches the voltage 4E.

Figure 4:
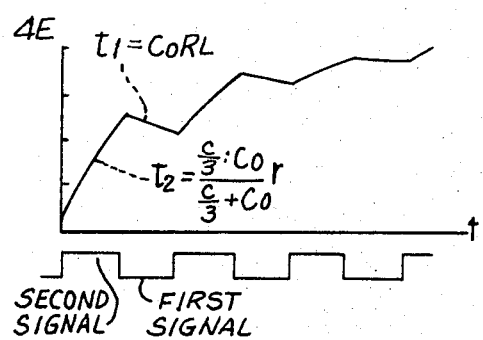
FIGS. 4 and 5 are charts showing the increase of the boosted voltage across the booster capacitor in response to the variation of the input signal.
Figure 5:
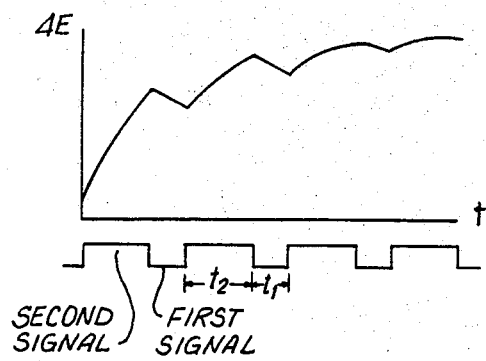

The input and output characteristics of a complementary MOS FET are shown in FIG. 4, wherein the abscissa represents the input voltage to the complementary MOS FET while the ordinate represents the output voltage therefrom. FIG. 4 shows that the higher the power supply voltage to the complementary MOS FET increases, the higher the input voltage for switching the complementary MOS FET increases.

As to the switching of the complementary MOS FET $M_2$, the P-channel FET $P_2$ is conductive, and N-channel FET $N_2$ is non-conductive when the switch S is connected to the terminal b. However, when the switch S is connected to the terminal a, the P-channel MOS FET $P_1$ becomes non-conductive while the N-channel MOS FET $N_1$ becomes conductive. Accordingly, the voltage of power supplying terminal $V_{DD2}$ of the complementary MOS FET $M_2$ is changed due to the characteristics $m_1$ shown in FIG. 4. After the N-channel MOS FET $N_2$ of the complementary MOS FET $M_2$ is conductive, the complementary MOS FET Mhd 3 is similarly switched with the characteristic $m_1$ shown in FIG. 4. Three capacitors are used in the abovementioned embodiments. It is, however, appreciated that the employment of N capacitors and switching elements allows the boosted voltage to be N+1 times higher than the power source voltage. When the MOS FETs are used as electronic switches as shown in the embodiment of the present invention, greater effects are expected than with usual bipolar transistors. That is, the MOS FET requires only very little power for controlling because the input resistance is very high. Furthermore, the conductive resistance is very low while non-conductive resistance is very high, so that power dissipation is held to a very low value. Accordingly, converting efficiency for boosting is extremely high. Additionally, the controlling of the gates is advantageously realized only at low voltage, because the gates are connected to ground.

As mentioned above, the present invention comprises complementary MOS FETs for switching the connection of the capacitors from parallel connection to series connection relative to the booster power source, so that switching requires only very little power.

Furthermore, the present invention is suitable for use as a small-sized booster circuit because of the use of integrated MOS FETs, diodes and capacitors. Accordingly, the booster circuit according to the present invention is adapted for use as a booster circuit for a watch wherein a liquid crystal display panel is employed because the liquid crystal has extremely high resistance.

What is claimed is:

1. A booster circuit comprising a plurality of complementary field effect transistor elements each including P type and N type complementary field effect transistors having source, drain and gate terminals in drain-to-drain and gate-to-gate configuration; a booster power supply for supplying a voltage to the source terminals of said N type complementary field effect transistors; an input terminal connected to the gate terminals of said complementary field effect transistors for controlling the output of said each complementary field effect transistor element; signal means for applying to said input terminal a voltage having first and second alternately appearing levels; a plurality of capacitors one terminal of which is connected to the drain terminal of one of said complementary field effect transistor elements and the other of which is connected to the source terminal of the following P type complementary field effect transistor and to the gate terminal thereof and said input terminal through a diode, said capacitors being thereby connected in parallel to said power supply and charged when said voltage with the first level is applied to said input terminal and being connected in series with each other and with said power supply when said voltage with the second level is applied to said input terminal; and a booster output capacitor connected in series with said plurality of capacitors and said power supply when said voltage of the second level is applied to said input terminal, thereby producing a boosted voltage across said booster output capacitor.

2. A booster circuit comprising a plurality of field effect transistor elements each including two field effect transistors of one polarity having source, drain and gate terminals, a capacitor connected between the source terminal of one of said two field effect transistors and the drain terminal of the other thereof; a booster power supply for supplying a voltage to the drain terminals of said one of two field effect transistors in said field effect transistor elements; an input terminal connected to the gate terminals of said field effect transistors for controlling the output of said field effect transistor element; a second plurality of field effect transistors having source, drain, and gate terminals, the source and drain terminals thereof being connected in series with said plurality of capacitors and said booster power supply, and the gate terminals thereof being connected to said input terminal; signal means for applying to said input terminal a voltage having first and second alternately appearing levels, said capacitors being thereby connected in parallel to said power supply and charged when said voltage with the first level is applied to the gate terminals of said field effect transistor element and being connected in series with each other and with said power supply when said voltage with the second level is applied to said gate terminals of said second plurality of field effect transistors; and a booster output capacitor connected in series with said plurality of capacitors and said power supply when said voltage of the second level is applied to said gate terminal of said second plurality of field effect, thereby producing a boosted voltage across said booster output capacitor.

* * * * *